United States Patent [19]
Pechersky

[11] Patent Number: 5,920,017
[45] Date of Patent: Jul. 6, 1999

[54] THERMAL INPUT CONTROL AND ENHANCEMENT FOR LASER BASED RESIDUAL STRESS MEASUREMENTS USING LIQUID TEMPERATURE INDICATING COATINGS

[75] Inventor: Martin J. Pechersky, Aiken, S.C.

[73] Assignee: Westinghouse Savannah River Company, Aiken, S.C.

[21] Appl. No.: 08/961,302

[22] Filed: Oct. 30, 1997

[51] Int. Cl.$^6$ ............................................. G01B 11/16
[52] U.S. Cl. ............................................. 73/762; 73/800
[58] Field of Search ........................... 73/762, 775, 776, 73/768, 800; 356/345, 360; 427/10

[56] References Cited

U.S. PATENT DOCUMENTS

| | | | |
|---|---|---|---|
| 2,929,242 | 3/1960 | Bell | 73/800 |
| 3,034,395 | 3/1962 | Zandman | 73/762 |
| 3,715,915 | 2/1973 | Williams | 73/800 |
| 4,248,094 | 2/1981 | Thompson et al. | 73/760 |
| 4,939,368 | 7/1990 | Brown | 73/800 |
| 5,394,752 | 3/1995 | Reda | 73/800 |
| 5,426,498 | 6/1995 | Brueck et al. | 73/800 |
| 5,432,595 | 7/1995 | Pechersky | 73/800 |
| 5,438,402 | 8/1995 | Gupta | 356/35.5 |
| 5,568,259 | 10/1996 | Kamegawa | 73/800 |
| 5,728,944 | 3/1998 | Nodolink | 73/800 |

*Primary Examiner*—Max H. Noori
*Attorney, Agent, or Firm*—Hardaway Law Firm, P.A.

[57] ABSTRACT

An improved method for measuring residual stress in a material comprising the steps of applying a spot of temperature indicating coating to the surface to be studied, establishing a speckle pattern surrounds the spot of coating with a first laser then heating the spot of coating with a far infrared laser until the surface plastically deforms. Comparing the speckle patterns before and after deformation by subtracting one pattern from the other will produce a fringe pattern that serves as a visual and quantitative indication of the degree to which the plasticized surface responded to the stress during heating and enables calculation of the stress.

33 Claims, 1 Drawing Sheet

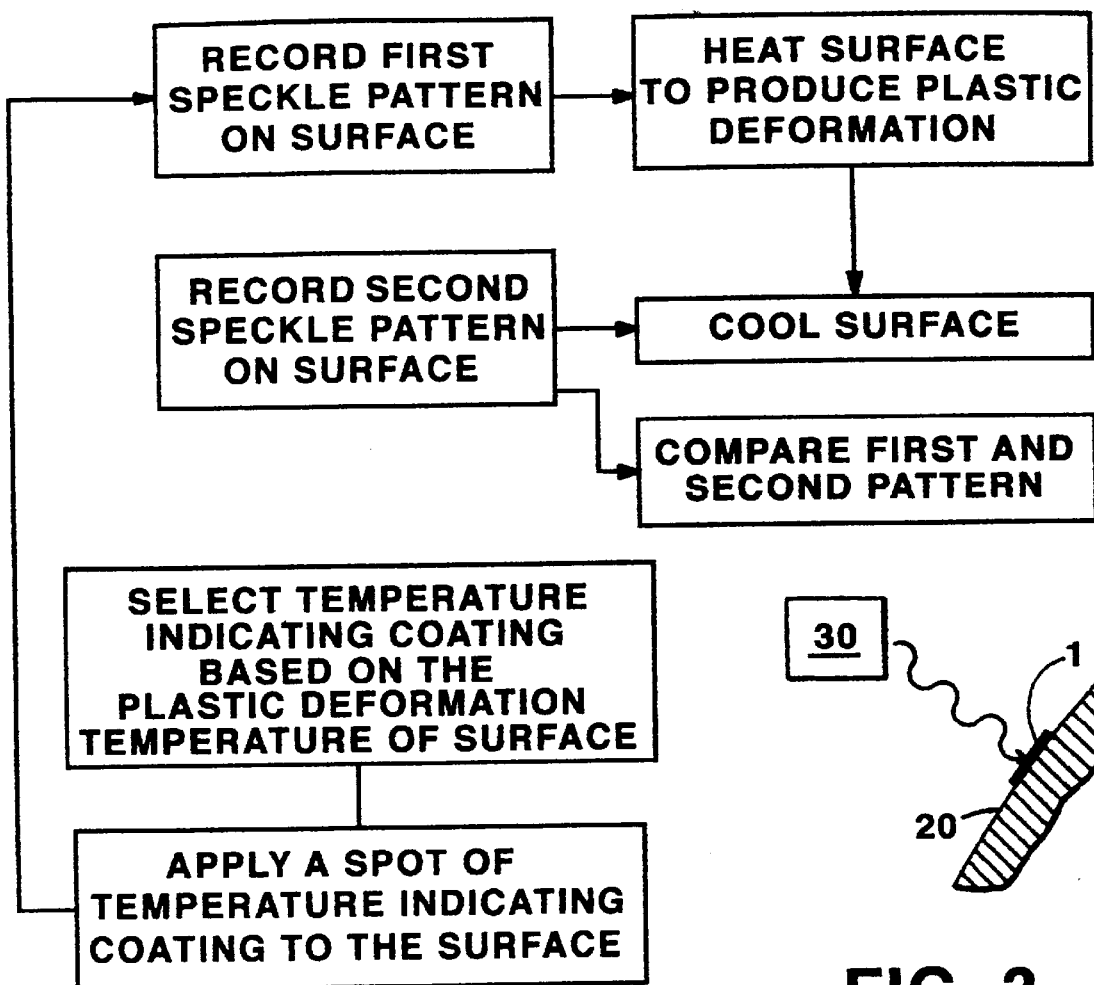
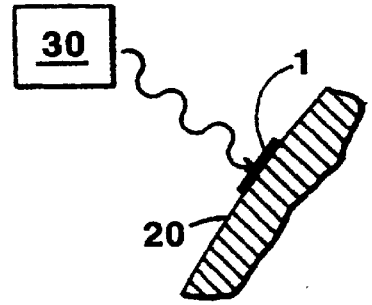
FIG. 3
FIG. 1
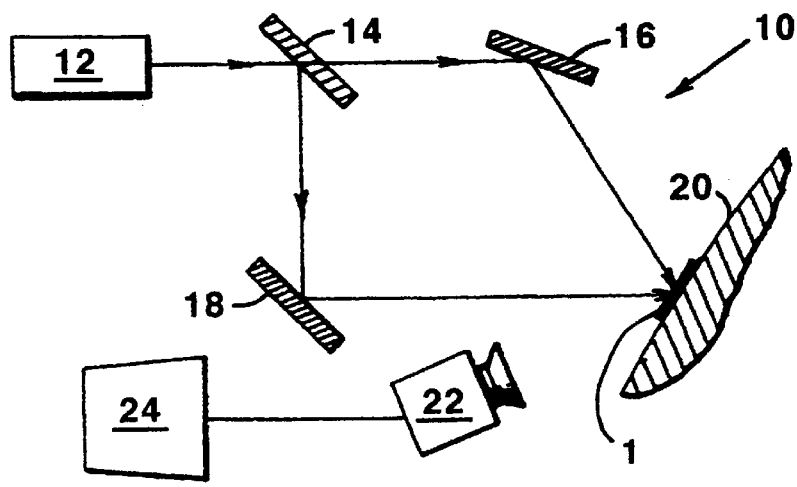
FIG. 2

THERMAL INPUT CONTROL AND ENHANCEMENT FOR LASER BASED RESIDUAL STRESS MEASUREMENTS USING LIQUID TEMPERATURE INDICATING COATINGS

The United States Government has rights in this invention pursuant to Contract No. DE-AC09-89SR 18035 between the U.S. Department of Energy and Westinghouse Savannah River Company.

BACKGROUND OF THE INVENTION

1. Field of the Invention

The present invention relates to an improved method of measuring stress in materials. In particular, the present invention is a method for measuring residual stress in a variety of materials, including metals, using a method which combines laser interferometry and laser annealing in conjunction with a liquid temperature indicating coating.

2. Discussion of Background

Materials used in construction that are made of metals and metal alloys are prone to a phenomenon known as stress corrosion cracking. In this phenomenon, cracks appear in areas of tensile stress, such as welded joints, as a result of the migration of chloride atoms to grain boundaries in the material. Tensile stresses are induced in manufacturing operations such as bending, heat treating, grinding and welding. The presence of stress in material is one factor in the cause of stress corrosion cracking, but other factors are also important. Two additional factors are the specific metallurgical makeup of the material and the environment of use.

Residual stresses add to the load applied to a part used in construction. If the structural design is not sufficiently conservative, the part can fail from the combination of the load and material stresses. By having a method for accurately measuring the residual stresses in individual parts, a designer can have a better understanding of the total loads on them. With that understanding, the designer can predict failure with greater certainty and design to avoid failure or to relieve the stresses.

Stress measurement at the surface of a metal object is especially important because most failures begin there. Surface stress will result in cracks that propagate more rapidly, then tend to pull the material apart. Welding in particular imparts surface stresses because it imposes sharp temperature gradients between the exterior and the interior regions of a material, resulting in plastic deformation of the exterior and elastic deformation of the interior of the material.

Residual stresses are currently measured in a number of different ways. Both destructive and non-destructive methods are available to determine residual stress in the object of interest. Destructive methods include those based on drilled specimens or chemical etching. Nondestructive methods include acoustic, x-ray, magnetic and optical methods.

Several residual stress measurement methods employ an annealing process to provide stress relief due to localized melting. Of particular interest is the non-destructive optical method disclosed by Pechersky in U.S. Pat. No. 5,432,595, incorporated herein by reference, involving the use of a combination of electronic speckle pattern interferometry (ESPI) (hereinafter laser interferometry) and laser annealing. Methods involving the use of an annealing step require that the amount of heating be carefully controlled and that the peak temperature of the spot be known precisely.

Nothing in prior patents or methods teaches the use of temperature indicating coatings in residual stress measurement. Temperature indicating coatings have been found to provide significant advantages in temperature control and detection to those stress measurement techniques which rely on an annealing process. The use of temperature indicating coatings have proved to have particular advantage when used to measure stresses in metal.

SUMMARY OF THE INVENTION

According to its major aspects, here briefly described, the present invention is an improved method for measuring residual stress using a combination of laser interferometry and laser annealing in conjunction with a temperature indicating coating. This method finds a particular use in the determination of residual stresses in welds in piping but has broad applicability in measuring stresses in any metal or metal alloy used in any construction, including aircraft and bridges, and in other, plastically-deformable materials as well.

According to the method, first a spot of temperature indicating coating, commonly referred to as temperature indicating paint, is applied to the region of interest. Two beams of light from a single, low-power laser (such as a helium-neon laser) are then directed onto this spot of temperature indicating coating. The beams of low-powered laser light interfere to create a first interference pattern ("speckle pattern") that is recorded and stored on a programmed, general purpose computer. Then a high-powered laser, the annealing laser, is directed at the spot of temperature indicating coating, and sufficient energy is applied to the coating to cause the material whose stress is to be measured, the base material, to deform plastically. Upon illumination by the high powered laser, the temperature indicating coating absorbs a large fraction of the laser light and converts it to heat. Heat is transferred through the coating to the base material by conduction. After the material cools, a second speckle pattern is collected, recorded and stored on the same computer. The bit values of one of the speckle patterns are subtracted from the values of the other to produce a "fringe pattern". The number of fringes in the fringe pattern is a quantitative and visual indication of the residual stress at that location, because it indicates the change in the surface produced when the material is allowed to move in response to the stress.

A key feature of the present invention is the use of a temperature indicating coating in conjunction with laser annealed laser interferometry, a technique used to determine residual stresses in materials.

The use of a temperature indicating coating is a significant improvement over the prior art in that the peak temperature of the heated surface can be known precisely, the exact location of the heated surface can be determined, and the amount of heat to which a surface is subjected can be carefully controlled. To date, residual stress measurement techniques which have relied on a laser annealing process required the use of electronic control circuits or temperature sensors in order to precisely control the heat to which the sample was subjected. Selection of temperature indicating coatings which melt away or become non-absorbing once reaching a desired temperature allows an exact yet inexpensive determination of the peak temperature to which a sample is subjected. Further, the exact location and area of the sample subjected to heating can be readily ascertained by measurement of the coated area.

Temperature indicating coatings are particularly advantageous for use with highly reflective materials, such as metals, which do not readily absorb laser energy, but which constitute the bulk of surfaces on which these type of measurements will be performed. The application of temperature indicating coatings to highly reflective surfaces provides a temperature control mechanism. At a pre-selected temperature, the temperature indicating coating will become non-absorbent to laser energy or melt away. This change in the coating effectively arrests energy input to the surface, even if the annealing laser remains on. In addition, use of the instant method allows the temperature to which the object's surface is subjected to be determined to within 1 degree Celsius. Further, the introduction of a temperature indicating coating for use with these materials vastly improves the transfer of laser energy into the surface during heating, allowing use of a significantly smaller annealing laser. The use of temperature indicating coatings has been shown to reduce the annealing laser power required by approximately two orders of magnitude. The use of a smaller annealing laser has the additional benefit of improving the overall safety of the measurement process by reducing the amount of light scattered from the test piece.

Other features and their advantages will be readily apparent to those skilled in the art of stress measurement following a careful reading of the Detailed Description of Preferred Embodiments of the present invention accompanied by the following drawings.

BRIEF DESCRIPTION OF THE DRAWINGS

In the drawings:

FIG. 1 is a flow chart illustrating the method according to the present invention;

FIG. 2 is a schematic diagram of the configuration used during laser interferometry, for practice of the method of FIG. 1; and FIG. 3 is a schematic diagram of the configuration used during surface heating, for practice of the method of FIG. 1.

DETAILED DESCRIPTION OF PREFERRED EMBODIMENTS

The present invention is an improved method for measuring stress in a material based on a technique which combines laser interferometry and laser annealing in conjunction with a temperature indicating coating. Laser annealed laser interferometry is a nondestructive method by which stresses contained in a material may be measured, as discussed in the prior art in U.S. Pat. No. 5,432,595.

Liquid temperature indicating coatings are commonly used in the metal working industry during the thermomechanical processing of materials. The coating comes in several different forms which can be easily applied to the material. The temperature at which the coating melts can be specified to within about +/− one degree Celsius. While the coating was found to be highly absorbing in the far infrared region, additional material such as graphite, phosphate or zinc phosphate may be mixed in with the coating to improve its absorption properties. These additives are commonly used to improve absorption in laser surface hardening processes.

The method of the instant invention can be applied to many different materials. The stress may be either residual or applied stress or a combination of both, although measuring residual stress is a particular concern of the present invention. Certainly metals and metal alloys lend themselves well with this method and stress measurement in welded piping, aircraft bodies, and so on, is of particular importance. However, many plastics and glasses can also be the subject of the method if they deform plastically. Many objects deform elastically up to a point when, with the application of further stress, they deform plastically; that is, when a sufficient load is applied to an object and then removed, the final shape of the object will be different than the preloaded shape.

The method, illustrated in FIG. 1, involves the use of two lasers in conjunction with a temperature indicating coating. First, a temperature indicating coating is chosen which ceases to absorb energy at temperature above the plastic deformation temperature of the surface of interest. The temperature required at the surface in order to induce plastic deformation can be determined by consulting a standard reference such as metals handbook to determine the melting and plastic deformation temperatures of the material. A spot of the selected temperature indicating coating is then applied to the surface of the object. In a preferred embodiment, the temperature indicating coating melts away at the plastic deformation temperature and thereby ceases to absorb laser energy.

Next, the first laser is used to establish a first speckle pattern surrounding the spot of temperature indicating coating before the heat is applied and then a second speckle pattern is established on the same area after the stress is relieved by cooling. The two patterns are recorded and stored for comparison by a computer technique called subtraction, in which the bit values at each location of one speckle pattern are subtracted from the bit values at the corresponding locations of the other pattern. The result of the comparison is a "fringe pattern" that correlates to the stress present in the object and from which the amount of stress can be mathematically derived.

The first laser should be a "low power" laser; that is, it should simply illuminate the spot of temperature indicating coating in order to establish the speckle pattern. The laser will then need to be sufficiently bright to illuminate the object from the distance the light must travel to and from the object. Preferably, the laser will be a helium-neon laser or diode laser to meet the requisite brightness and spectrum of light so as to be visible to a CDC camera.

The speckle patterns are established by the well known techniques of interferometry. In particular, a speckle pattern is produced when a laser beam is divided to form two beams of light, and the two beams are directed to the same, diffusely reflecting surface. The beams randomly interfere, to produce a grainy, speckly appearance that, on close inspection, comprises tiny regions of light and dark areas where the beams interfere constructively and destructively, respectively. The light reflected by the area surrounding the temperature indicating coating, the first speckle pattern, is recorded and stored by a programmed, general or special purpose computer.

The second laser must be of higher power output than the first and is preferably an infrared laser capable of depositing sufficient heat on the spot of temperature indicating coating. Sufficient heat must be applied to produce slight plastic deformation, rather than melting, of the surface.

Upon application of sufficient energy from the second laser, the speckle pattern will change as the material deforms plastically to relieve the stress in the surface material of the object. Upon cooling, the second speckle pattern is recorded by and stored in the computer. The visual differences between the first and second speckle patterns are related to the residual stress in the material. The two patterns are compared by subtracting the first from the second, or, equivalently, the second from the first. "Subtracting" is a technique common in computer comparisons and simply refers to the technique of subtracting the bit values assigned to represent the relative brightness of each location of one of the patterns from the brightness bit values assigned to the corresponding locations of the other pattern. The result will be a fringe pattern.

The second infrared laser is directed onto the object's surface for a short period of time ranging from a fraction of a second to a few seconds, depending on the nature of the material and the amount of stress believed to be present. However, shorter or longer heating periods may be used if appropriate to produce slight plastic deformation. In the instant method, energy is applied to the coated spot until the temperature indicating coating ceases to absorb laser energy. In the preferred embodiment, the temperature indicating coating ceases to absorb laser energy by melting away from the surface to be measured. In this embodiment of the instant invention, the annealing laser is applied to the spot of temperature indicating coating for a period of time slightly longer than that required to melt the temperature indicating coating away in order ensure that the surface reached its plastic deformation temperature.

A fringe pattern is a series of light and dark bands that are related to the stretching or unstretching of the surface. Because the surface has deformed in response to the stress, and because the deformation is in response to the relief from stress, the fringe pattern is a visual indication or manifestation of the residual stress and can be related quantitatively to the stress in the material.

Stress produces the movement of mass that causes this deformation. If the following are known: (1) temperature profile of the surface during the time the second laser was applied; (2) the length of time the second laser is applied; (3) direction and extent of mass movement; and (4) the characteristics of the material of which the object is made, then the residual stress, σ, can be calculated.

For example, in the case of a uniformly applied uniaxial stress with uniform heating this calculation can be performed with the following equation:

$$\sigma = [(L-d)/d] \cdot E \cdot \epsilon_a + [1-(d/L)^2(E/E_H - 1)]\sigma_Y + [(L-d)/L] \cdot d/L \cdot E \cdot \alpha \cdot \Delta T$$

where $\epsilon_a = \lambda \div (2\Delta x \cdot \sin(\theta))$, and where d=diameter of temperature indicating coating σ=the value of the tensile or compressive stress being measured, E=the value of Young's Modulus prior to laser heating, $\epsilon_a$=the in-plane strain resulting from the stress relaxation, $\sigma_y$=the yield stress at the elevated temperature, $E_H$=the value of Young's Modulus at the elevated temperature, α=the coefficient of thermal expansion of the material averaged over the range of temperatures expected, ΔT=the temperature rise due to the laser heating, λ=the wavelength of the laser light for the speckle interferometer, L=guage length over strain (i.e., diameter of speckle pattern)

Δx=the measured fringe spacing after performing the image substraction, and

θ=the angle of incidence of the interferometer laser beams.

Suitable apparatus for carrying out the method according to the present invention is illustrated schematically in FIGS. 2 and 3. An apparatus 10 for laser interferometry includes a laser 12, a beam splitter 14, and reflectors 16, 18. A beam of light from laser 12 is divided by beam splitter 14 to form two beams, which are directed to a region surrounding a spot of temperature indicating coating 1 applied to the surface 20 of an object by reflectors 16, 18. At spot 1, the beams interfere randomly to produce a speckle pattern. The speckle pattern is detected and recorded by a recorder 22, and stored by a computer 24. To implement the method, a first speckle pattern of spot 1 is produced and recorded using apparatus 10, then, a second laser 30 (preferably an infrared laser) heats spot 1 in order to produce plastic deformation. A second speckle pattern is recorded, and the differences between the two patterns are compared using computer 24. The second pattern is subtracted from the first (or vice versa) to produce a fringe pattern that is a visual indication of the residual stress in the object.

It will be apparent to those skilled in the art that many changes and modifications can be made to the foregoing description of preferred embodiments without departing from the spirit and scope of the invention, as defined by the appended claims.

What is claimed is:

1. A method for producing a visual indication of stress in a surface of a material, said method comprising the steps of:

applying a coating to a material surface said coating selected to match the a peak temperature of the material surface;

dividing light from a first laser into two beams;

directing said two beams onto a region surrounding said coating to establish a first light interference pattern;

recording said first interference pattern;

heating said surface sufficiently by said coating absorbing energy from said laser beam, said heating sufficient to deform said surface plastically;

directing said two beams of light onto said means to establish a second interference pattern on said means;

recording said second interference pattern; and comparing said first and said second interference patterns to determine visual differences between said first and said second interference patterns as a result of said deformation.

2. The method as recited in claim 1, wherein the coating is a temperature indicating coating.

3. The method as recited in claim 2, wherein the coating has a light absorption range which corresponds to a desired target temperature for said material surface.

4. The method as recited in claim 1, wherein said heating step further comprises the step of directing light from a second laser onto said first interference pattern.

5. The method as recited in claim 1, wherein said heating step further comprises the step of directing light from a second laser onto said first interference pattern, said second laser emitting far infrared light.

6. The method as recited in claim 1, wherein said heating step further comprises the steps of:

directing light from a second laser onto said first interference pattern, said second laser emitting infrared light at an intensity sufficient to deform said surface plastically.

7. The method as recited in claim 1, wherein said heating step further comprises the step of directing light from a second laser onto said first interference pattern, long enough to deform said surface plastically.

8. The method as recited in claim 2, wherein said temperature indicating coating ceases to absorb laser energy by melting away at a desired target temperature.

9. The method as recited in claim 1 wherein said coating further comprises an additive which promotes absorption of laser energy.

10. A method for producing a visual indication of stress in a surface of a material, said method comprising the steps of:
   (a) applying a coating to a material surface, said coating selected to match the peak temperature of the material surface, said coating further comprising an additive which promotes absorption of laser energy, and wherein said additive is selected from the group consisting of graphite, phosphate and zinc phosphates;
   (b) dividing light from a first laser into two beams;
   (c) directing said two beams onto a region surrounding said coating to establish a first light interference pattern;
   (d) recording said first interference pattern;
   (e) heating said surface sufficiently by said coating absorbing energy from said laser beam, said heating sufficient to deform said surface plastically;
   (f) directing said two beams of light onto said region to establish a second interference pattern;
   (g) recording said second interference pattern; and
   (h) comparing said first and said second interference patterns to determine visual differences between said first and said second interference patterns as a result of said deformation.

11. The method as recited in claim 10, wherein said first and said second interference patterns are stored on a computer in the form of binary bit values, and wherein said comparing step further comprises the step of subtracting bit values representing said first interference pattern from bit values representing said second interference pattern.

12. The method as recited in claim 10, further comprising the step of dividing light from a laser into said two beams.

13. The method as recited in claim 10, further comprising the step of allowing said region to cool before establishing said second interference pattern.

14. A method for producing a visual indication of stress in a surface of a material, said method comprising the steps of:
   applying a temperature indicating coating to the surface to be studied;
   directing two beams of light from a single laser onto said temperature indicating coating to establish a first light interference pattern;
   recording said first interference pattern in the form of binary bit values;
   directing light from a far infrared laser onto said temperature indicating coating, said coating absorbing energy from said light and thereby heating said surface in order for said surface to deform plastically;
   directing said two beams of light onto said means to establish a second interference pattern on said means;
   recording said second interference pattern in the form of binary bit values; and
   subtracting bit values of said first interference pattern from bit values of said second interference pattern whereby said difference in bit values results in a fringe pattern indicative of said stress.

15. The method as recited in claim 14, wherein said surface is heated sufficiently to deform plastically.

16. The method as recited in claim 14, further comprising the step of dividing light from said first laser into two beams.

17. The method as recited in claim 14, further comprising the step of dividing light from a laser into said two beams.

18. The method as recited in claim 14, further comprising the step of allowing said surface to cool before establishing said second interference pattern.

19. The method as recited in claim 14, wherein the said temperature indicating coating ceases to absorb laser energy upon reaching the plastic deformation temperature of the surface.

20. The method as recited in claim 19, wherein said temperature indicating coating ceases to absorb laser energy by melting away and said second interference pattern is established on said surface.

21. A method for producing a visual indication of stress in a surface of a material, said method comprising the steps of:
   (a) applying a temperature indicating coating to the surface to be studied, wherein said coating contains an additive which promotes absorption of laser energy;
   (b) directing two beams of light from a single laser onto said coating to establish a first light interference pattern;
   (c) recording said first light interference pattern in the form of binary bit values;
   (d) directing light from a far infrared laser onto said coating, said coating absorbing energy from said light and thereby heating said surface in order for said surface to deform plastically, whereafter said coating ceases to absorb laser energy by melting away;
   (e) directing said two beams of light onto said plastically deformed surface to establish a second light interference pattern;
   (f) recording said second light interference pattern in the form of binary bit values; and
   (g) subtracting bit values of said first light interference pattern from bit values of said second light interference pattern whereby the difference in bit values provides a fringe pattern indicative of said stress.

22. The method as recited in claim 21, wherein the said additive is selected from the group consisting of graphite, phosphate or zinc phosphate.

23. A method for measuring stress in a surface of an object, said method comprising the steps of:
   applying a temperature indicating coating to the surface to be studied;
   dividing light from a first laser into two beams;
   directing said two beams onto a region surrounding said coating to produce a first interference pattern;
   recording said first interference pattern in the form of binary bit values;
   directing light from a second laser onto said coating, said coating absorbing energy from said second laser to heat said surface, said second laser being an infrared laser;
   directing said two beams onto said coating to produce a second interference pattern;
   recording said second interference pattern in the form of binary bit values;
   subtracting bit values of said first interference pattern from bit values of said second interference pattern to produce a fringe pattern indicative of said stress in said surface; and
   calculating said stress from said fringe pattern.

24. The method as recited in claim 23, wherein said surface is heated sufficiently to deform plastically.

25. The method as recited in claim 23, wherein the said temperature indicating coating ceases to absorb laser energy upon reaching the plastic deformation temperature of the surface.

26. A method for measuring stress in a surface of an object, said method comprising the steps of:
  (a) applying a temperature indicating coating to the surface to be studied;
  (b) dividing light from a first laser into two beams;
  (c) directing said two beams onto a region surrounding said coating to produce a first interference pattern;
  (d) recording said first interference pattern in the form of binary bit values;
  (e) directing light from a second laser onto said coating, said coating absorbing energy from said second laser to heat said surface to a desired temperature, wherein at said desired temperature said coating ceases to absorb laser energy by melting away said second laser being a far infrared laser;
  (f) directing said two beams onto said surface such that a second interference pattern is established on said surface;
  (g) recording said second interference pattern in the form of binary bit values;
  (h) subtracting bit values of said first interference pattern from bit values of said second interference pattern to produce a fringe pattern indicative of said stress in said surface; and
  (i) calculating said stress from said fringe pattern.

27. The method as recited in claim 26, wherein the temperature indicating coating contains an additive which promotes absorption of laser energy.

28. The method as recited in claim 27, wherein the said additive is selected from the group consisting of graphite, phosphate or zinc phosphate.

29. The method as recited in claim 26, wherein the said infrared laser illuminates the said surface for a time that is known to be slightly longer than the time it takes the coating to melt away.

30. The method as recited in claim 26, further comprising the steps of:
  (e1) increasing power of said far infrared laser if said surface has not deformed as a result of heating; and
  (e2) reheating said surface with said far infrared laser to deform said surface.

31. The method as recited in claim 26, wherein said surface is heated sufficiently to deform plastically.

32. The method as recited in claim 26, further comprising the step of dividing light from a laser into said two beams.

33. The method as recited in claim 26, further comprising the step of allowing said surface to cool before producing said second interference pattern.

* * * * *